United States Patent [19]

Meyer

[11] 4,076,246
[45] Feb. 28, 1978

[54] TARGET PARTICULARLY FOR ARCHERY

[76] Inventor: Leonard S. Meyer, 6449 Bridgewood Road, Columbia, S.C. 29206

[21] Appl. No.: 631,893

[22] Filed: Nov. 14, 1975

Related U.S. Application Data

[63] Continuation-in-part of Ser. No. 533,942, Dec. 18, 1974, abandoned.

[51] Int. Cl.² .............................................. F41J 3/00
[52] U.S. Cl. ........................... 273/102 B; 273/102 S; 156/313; 273/DIG. 4; 273/DIG. 5; 273/DIG. 6; 273/DIG. 8; 273/DIG. 12
[58] Field of Search .............................. 428/315, 911; 156/491.5, 494; 273/101, 102 B, 102 R, 102.4, 103, 105 R, 105.4, 105.6; 46/DIG. 24

[56] References Cited

U.S. PATENT DOCUMENTS

| 2,808,266 | 10/1957 | Rose | 273/105 |
|---|---|---|---|
| 2,818,258 | 6/1953 | Stern | 273/102 |
| 2,878,153 | 3/1959 | Hackländer | 264/321 |
| 3,048,401 | 8/1962 | Dishon | 273/102 |
| 3,088,738 | 5/1963 | Meyer | 273/102.4 |
| 3,100,115 | 10/1963 | Breneman | 273/102.4 |
| 3,164,384 | 1/1965 | Stewart | 273/102.4 |
| 3,197,207 | 7/1965 | Sanzare | 273/102.4 |
| 3,203,698 | 8/1965 | Saunders | 273/102.4 |
| 3,242,509 | 3/1966 | Nissen | 273/DIG. 4 |
| 3,306,616 | 2/1967 | Baldwin | 273/101 |
| 3,329,431 | 7/1967 | Roesner | 273/102 |
| 3,329,432 | 7/1967 | Pratt | 273/103 |
| 3,353,827 | 11/1967 | Dun | 273/DIG. 4 |
| 3,359,000 | 12/1967 | Schreider | 273/105.4 |
| 3,367,660 | 2/1968 | DiMaggio | 273/102 |
| 3,396,971 | 8/1968 | Estep | 273/102 |
| 3,398,958 | 8/1968 | Sanzare | 273/102.2 |
| 3,398,959 | 8/1968 | Sanzare | 273/102.2 |
| 3,409,300 | 11/1968 | Rockwood | 273/102 |
| 3,476,390 | 11/1969 | Roloff | 273/102 |
| 3,486,966 | 12/1969 | Allen | 428/911 |
| 3,510,133 | 5/1970 | Gretzky | 273/103 |
| 3,512,778 | 5/1970 | Allen | 273/102 |
| 3,518,786 | 7/1970 | Holtvoigt | 46/24 |
| 3,559,994 | 2/1971 | Larsen | 273/105.6 |
| 3,623,065 | 11/1971 | Rockwood | 340/326 |
| 3,652,089 | 3/1972 | O'Connor | 273/103 |
| 3,729,197 | 4/1973 | Swanson | 273/102.2 R |
| 3,729,370 | 4/1973 | Cobbledick | 428/311 |
| 3,762,709 | 10/1973 | Roloff | 273/102 B |
| 3,846,873 | 11/1974 | Saunders | 24/153 R |

OTHER PUBLICATIONS

Foam Craft Specialties Inc., 3/10/66.

*Primary Examiner*—Richard C. Pinkham
*Assistant Examiner*—Arthur S. Rose
*Attorney, Agent, or Firm*—Kenneth P. Synnestvedt

[57] ABSTRACT

A target made of interchangeable sections each comprising a multiplicity of membranes or plies of penetrable, elastomeric or resilient, tear resistant sheet resin material, the membranes being separated by intervening layers of porous or low density, resilient material such as foam resin material.

26 Claims, 27 Drawing Figures

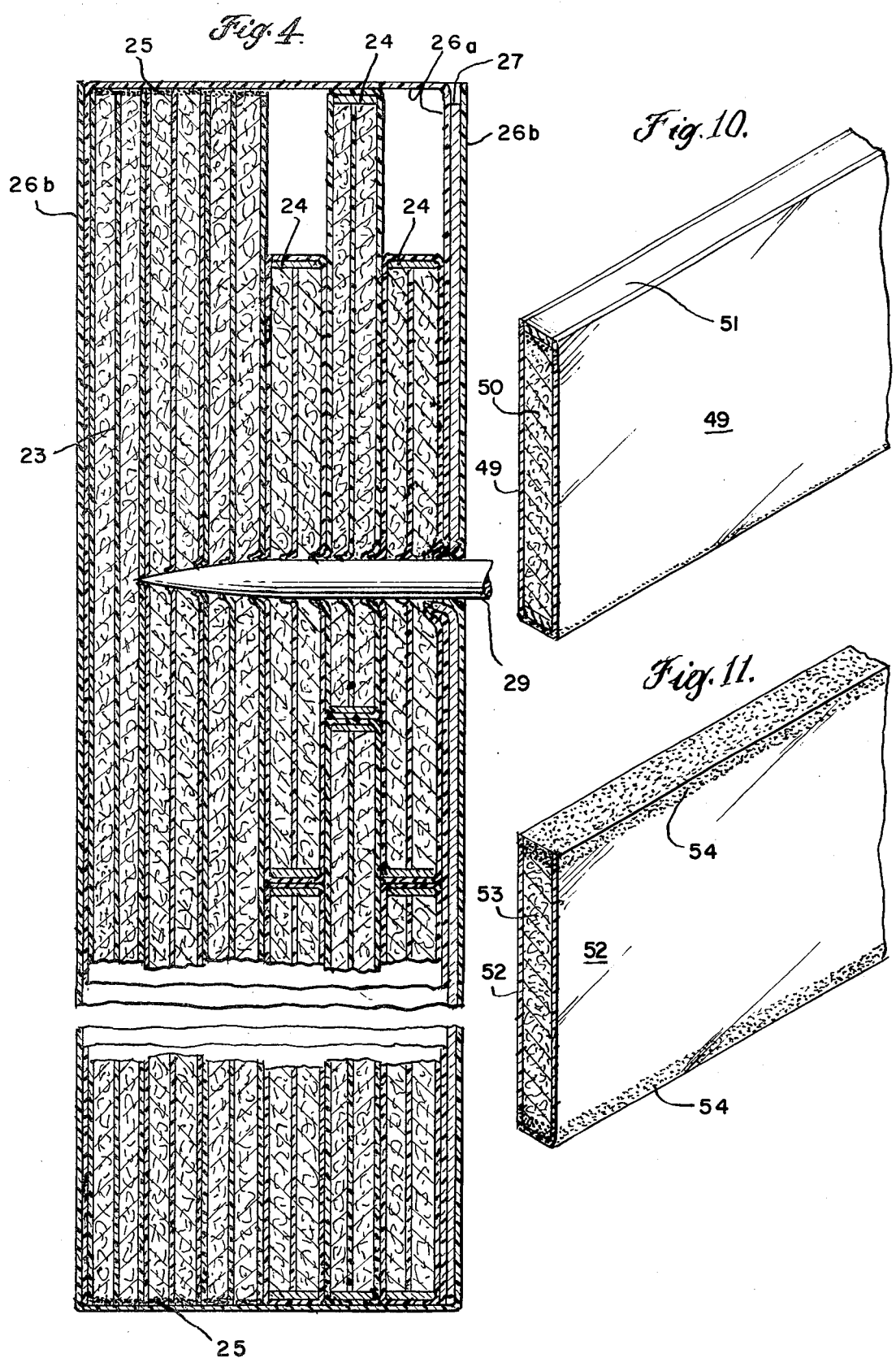

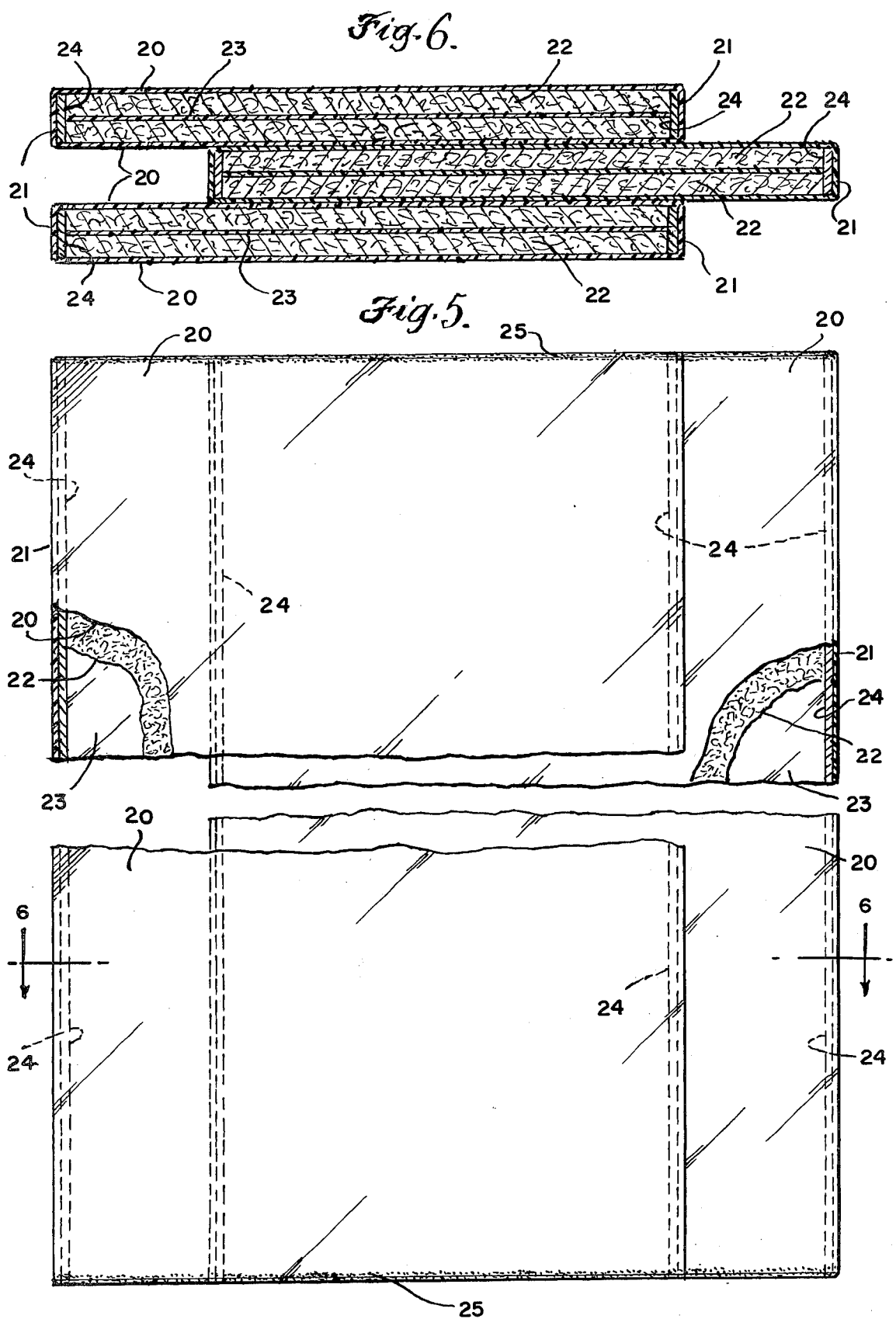

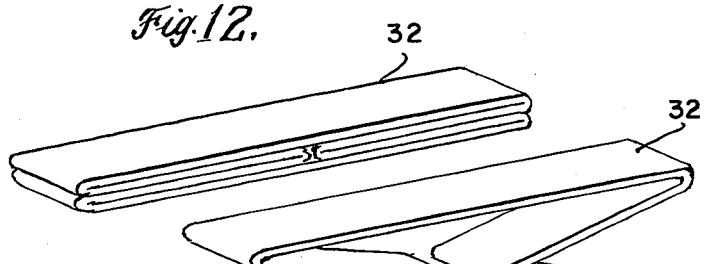
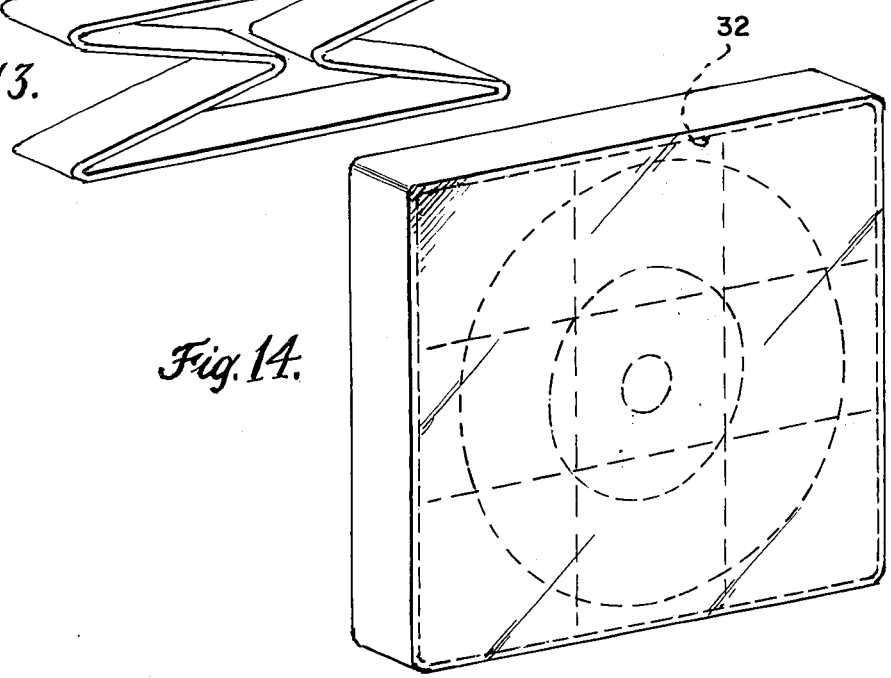
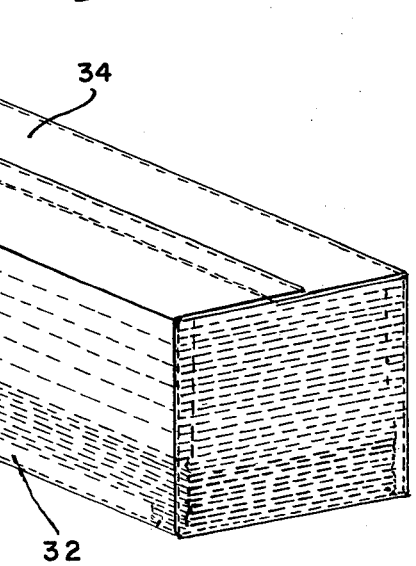

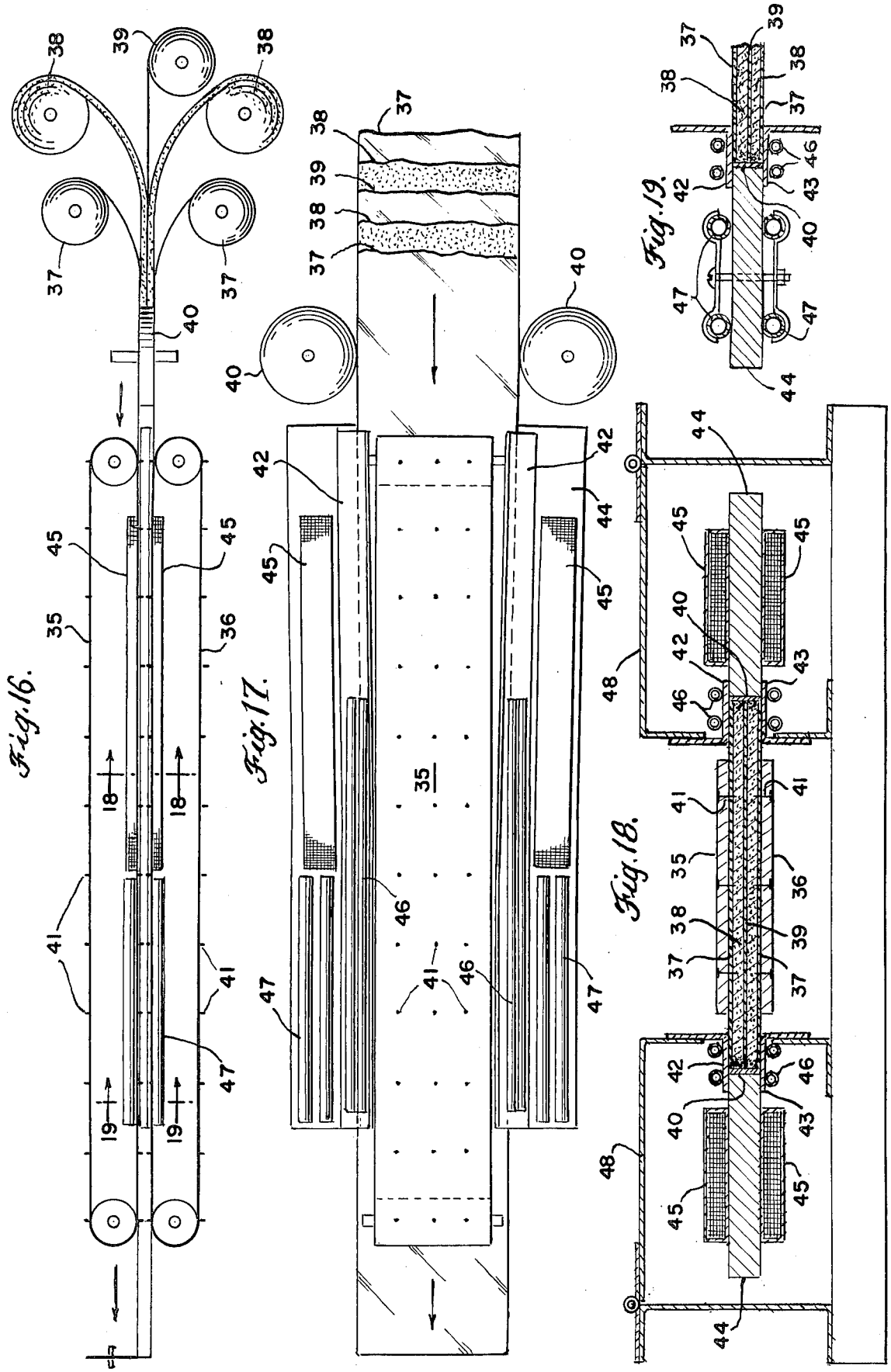

TARGET PARTICULARLY FOR ARCHERY

CROSS REFERENCE

The present application is a Continuation-in-part of my prior application Ser. No. 533,942, filed Dec. 18, 1974, since abandoned.

BACKGROUND AND STATEMENT OF OBJECTS

The invention is concerned with a target and while the target of the invention may be employed as a target for a variety of weapons, the target is particularly suitable for use as an archery target, in which connection the invention is described hereinafter.

Although some archery targets have been formed or constructed in various ways and from a variety of materials, the most common archery targets currently in use are formed of straw or similar materials. Conventional straw targets have a number of disadvantages including the fact that they are very heavy and are subject to rotting when exposed to the weather and are also subject to deterioration as a result of infestation by insects.

As commonly constructed, such targets are formed of matted masses of straw which are built up to form the target, a typical target being of the order of 3 feet in diameter. Targets built up in this manner are bulky, heavy and awkward to transport, package or ship.

In addition to the foregoing, the conventional form of target is a unitary or monolithic structure, and for this reason does not have a high degree of wear resistance, and thus also has a short life. Scoring considerations commonly result in much more numerous strikes in the central area of the target than in the other areas, so that the central area wears and weakens quite rapidly and at a much higher rate than the other areas of the target.

Certain targets have also been made of materials other than straw or the like, for instance certain resin type materials in the form of layers or plies of fabrics, foam and/or panels. In many of these prior forms of targets, the system for absorbing the energy of the arrows comtemplates deflection of panel type of elements, at least in a portion of the depth or thickness of the target, and particularly in the region of the back face of the target, thereby preventing penetration of the target by the arrows. In other examples of these resin targets, the energy absorption system utilizes penetrable fabric or foam layers, or both. Although targets of these types constructed of resin materials have certain advantages as compared with the conventional straw targets, for instance improved weather resistance, nevertheless they have not been widely accepted for a number of reasons, including the fact that the energy absorption systems utilized have been highly impractical or inefficient, with consequent necessity for the use of excessive quantities of the resin materials.

With the foregoing in mind, the present invention contemplates the provision of a target of basically different structure according to which various of the disadvantages of the prior targets are eliminated. The target of the present invention may weigh only a small fraction of the weight of a conventional straw target and even considerably less than prior targets formed of resin materials. Moreover, the target of the invention may be formed of materials which are virtually rot and vermin proof regardless of exposure to the weather.

In contrast to prior art targets, the target of the present invention is made up of a multiplicity of plies of what are referred to herein as "membranes", at least some of the membranes being spaced from each other by intervening layers of porous material, the membranes being penetrable by the arrows cast at the target and being formed of elastomeric or resilient and tear resistant sheet resin material having self-healing properties. In this construction, each of the multiplicity of membranes provide for development of a sleeve or annulus of the sheet material of the membrane surrounding the aperture produced by the penetration of an arrow, which sleeve because of the elastomeric characteristic of the sheet material snuggly engages the side wall or shaft of the arrow, thereby frictionally absorbing energy. The use of the porous spacing layers between membranes accommodates the formation of the sleeves referred to. This multiple membrane construction provides a highly efficient energy absorption system and thus provides for great reduction in the weight of materials used.

In contrast to various prior art targets employing the principle of panel deflection in order to absorb the energy of the arrow, the penetrable membrane arrangement of the present invention absorbs the energy by frictional engagement of the arrow shaft by the sleeves of the membrane material surrounding the apertures caused by the penetration. For applicant's purposes, it is important that the penetration occur and that panels, backing layers or target supports which are not penetrable should not be present, even at the back face of the target. The importance of this will be understood when it is kept in mind that typical arrows are 28 inches long, having 20 inches of free shaft available for sleeve sliding friction to absorb energy. Therefore, targets according to the invention may be constructed in a manner permitting penetration of the target even to an extent where the arrows project from the rear face.

In addition to providing a basically new and efficient system for energy absorption in the target, it is a further object of the invention to provide a target which may readily be assembled from components or sections which are capable of being interchanged so as to multiply the useful center life of the target by at least three.

The target of the invention is made up of elements and sections which are readily assembled and disassembled, so that when it is desired to move the target from one location to another it is not necessary to transport it in assembled condition. Moreover, the sectional construction of the target of the invention and the collapsible construction of the target stand provide for compact packaging of both the target and the stand in a common package for convenient shipping, even by parcel delivery services.

BRIEF DESCRIPTION OF THE DRAWINGS

How the foregoing and other objects and advantages are attained will appear more fully from the following description and accompanying drawings, in which:

FIG. 4 is an enlarged fragmentary sectional view taken as indicated by the section line 4—4 on FIG. 1 and illustrating the penetration of an arrow into the target;

FIG. 5 is an enlarged elevational view of a multi-element section embodying one form of elements according to the invention, the central portion of this view being broken out and certain parts being broken away as will further appear;

FIG. 6 is a sectional view of the multi-element section of FIG. 5, taken as indicated by the section line 6—6 on FIG. 5;

FIGS. 10 and 11 are enlarged fragmentary views of two different forms of elements which may be employed in the building up of targets according to the present invention;

FIG. 12 is an isometric view of a stiffening edge frame which may be employed for targets made up according to the present invention, FIG. 12 showing the edge frame in collapsed condition appropriate for shipment;

FIG. 13 illustrates the device of FIG. 12 in partially opened condition;

FIG. 14 illustrates the device of FIGS. 12 and 13 in fully opened condition and applied to a target;

FIG. 15 is an isometric, somewhat diagrammatic view of the various parts of a target stacked together for shipment and surrounded by an appropriate shipping cover;

FIG. 16 is a diagrammatic elevational view of equipment of the type which may be employed in the fabrication of various forms of the elements which may be employed in the target of the present invention;

FIG. 17 is an enlarged diagrammatic plan view of various parts shown in FIG. 16;

FIG. 18 is an enlarged transverse sectional view through certain parts in FIGS. 16 and 17, this view being taken as indicated by the section line 18—18 on FIG. 16 and showing the cross sectional configuration of an element being made by the equipment of FIGS. 16 and 17, the element here shown being somewhat different than the elements shown in other figures, and will further appear;

FIG. 19 is a fragmentary view similar to FIG. 18 but taken as indicated by the section line 19—19 on FIG. 16;

DETAILED DESCRIPTION OF THE DRAWINGS

Figure 1:
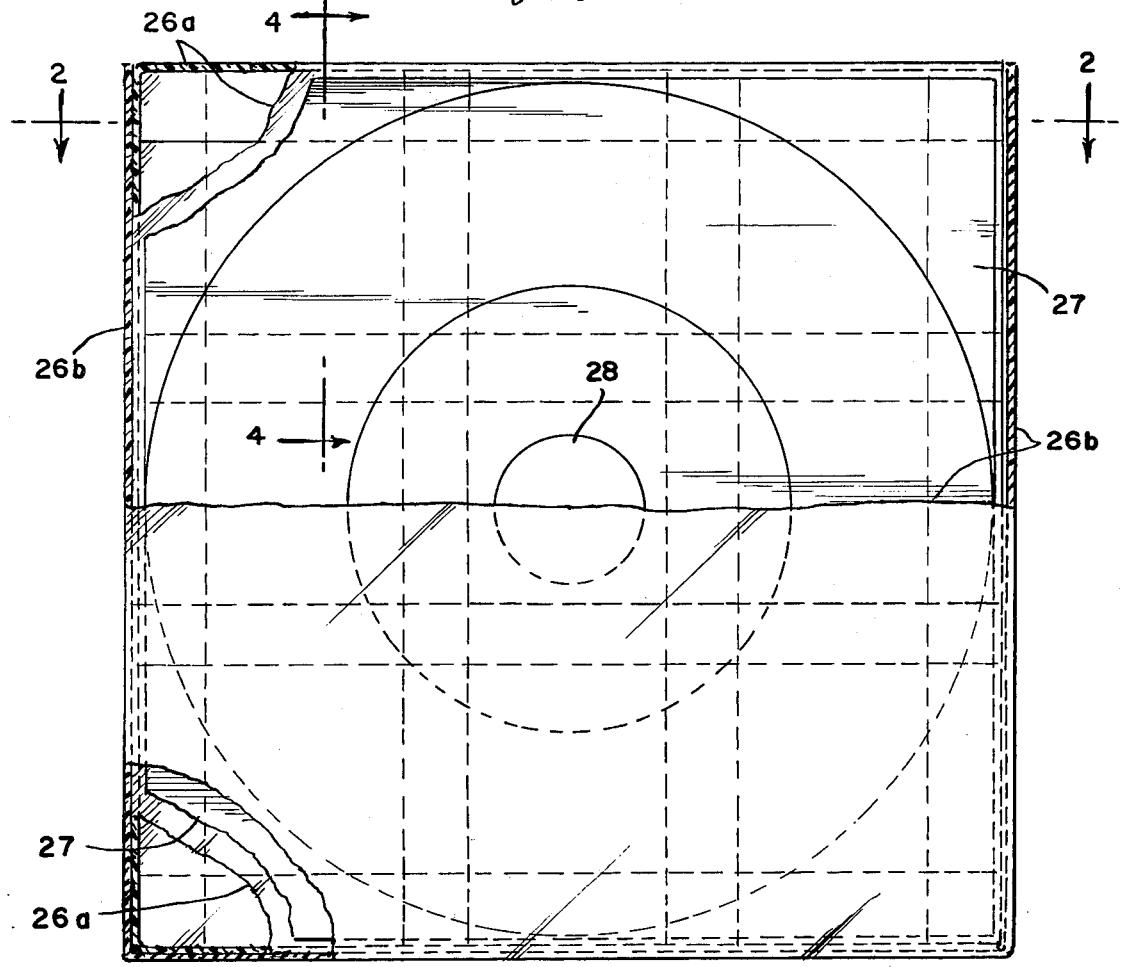
FIG. 1 is a face view of a target according to the present invention, with certain portions broken away to disclose others lying within the target.

As above indicated, the target of the present invention is made up of elements and sections, at least the sections being capable of being assembled and disassembled. The construction of these parts according to a typical embodiment of the invention is illustrated in FIGS. 5 and 6. Before considering those figures in detail, it is first pointed out that in a preferred embodiment of the invention, the various components are made up principally of resin materials. Each component comprises a plurality of penetrable membranes, formed for example of sheet polyethylene which is resilient and tear resistant, together with intervening layers of a porous or low density material, such as polypropylene foam, which is also resilient and tear resistant. As will further appear, the penetrable membranes or sheets of the polyethylene are the primary components acting to arrest the flight of the arrow within the target structure, the porous or foam material being present principally as spacer means between the membranes of polyethylene.

FIGS. 5 and 6 (and also FIGS. 4 and 9) illustrate one general form of the basic components, which I have termed "elements" and from which the components which I have termed "sections" are made up, there being three such elements in each section, as clearly appears in FIG. 6. This particular form of the basic elements may be made up in a variety of ways, for instance by forming a tube or sleeve of sheet polyethylene material enclosing the element and having portions 20,20 serving as penetrable membranes at opposite faces of the elements, and having portions 21,21 at the edges of the elements. Within the sleeve or tube are a pair of layers 22 formed of resilient porous or foam polypropylene, with an additional intervening strip 23 of sheet polyethylene serving as an additional penetrable membrane. Still further, within the edge portions of the element, stiffening strips such as the vulcanized fiber strips 24 are provided in order to contribute stiffness to the element. The strips 24 lie in planes perpendicular to the mean plane of the element and preferably extend throughout the entire length of the element.

The formation of the covering sleeve or tube of the element may be accomplished prior to insertion of the core layers of foam and of the central strip or membrane, but it is contemplated that the formation of the sleeve or tube be effected continuously from strip material as the parts are assembled.

Figure 2:
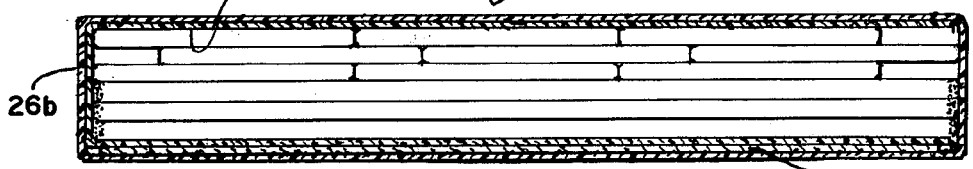
FIG. 2 is a sectional view taken as indicated by the section line 2—2 in FIG. 1, but with various of the elements within the target enclosure shown in elevation instead of in sections.

As will be seen, each element comprises a board like piece, and upon the assembly of three such elements in the manner clearly shown in FIGS. 5 and 6, the section of the target thereby produced comprises a tongue and groove component adapted to be interleaved or interengaged with other similar sections in edge-to-edge relation in the manner clearly apparent from FIGS. 1, 2 and 4. Staggered edge lap or other arrangements may be used to provide sections which when assembled do not present an area or line along which an arrow could bypass any substantial number of the elements.

Elements may be made up in various other ways as will be described hereinafter with reference to other figures, and a continuous fabricating technique for one type of element is also described hereinafter with reference to FIGS. 16 to 19.

The assembly of three elements which makes up each section of the target may be secured together in any of a variety of ways, for instance by employment of staples or adhesives. One preferred technique for interconnecting the elements embodied in a section is illustrated in FIG. 5. According to this technique, the end portions of the three elements of the section are subjected to heating in order to fuse or heat seal some of the resin material as is indicated at 25,25 at the top and bottom of FIG. 5. In this way, the resin material of the polyethylene sheeting employed and also the resin material of the foam strips will fuse together and thereby interconnect the ends of the three elements included in the section. This fusion will also develop a stiffened layer at the ends, thereby contributing to the stiffness of the sections.

As will be seen from examination of FIGS. 1, 2 and 4, the total target is made up by assembling a plurality of multi-element sections described above in connection with FIGS. 5 and 6. Specifically in connection with the embodiment illustrated, three sections are assembled in each of two parallel planes. As best seen in FIGS. 1 and 2, the three sections of one plane are positioned to extend horizontally of the target and the three sections assembled in the other plane are positioned to extend vertically in the target. This arrangement not only provides stiffness in both directions but also facilitates arrow removal and further reduces line-up of element edges.

Figure 3:
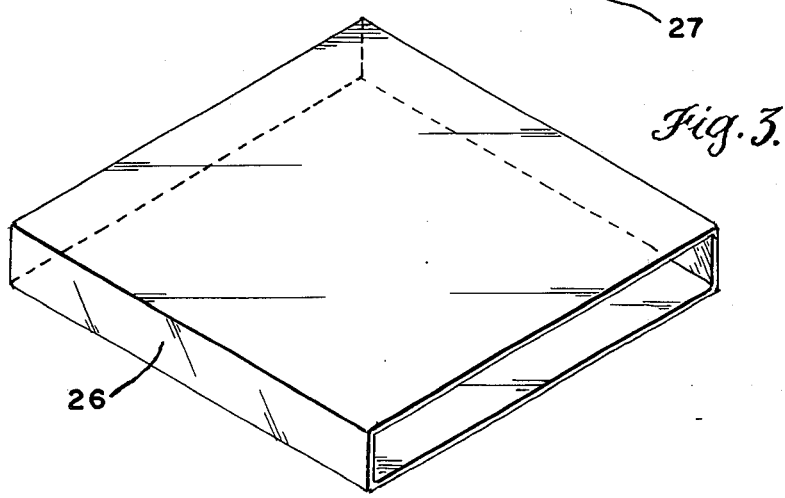
FIG. 3 is an isometric view of one of the open ended enclosure envelopes employed in the target of FIGS. 1 and 2.

The assembled sections of the target are preferably enclosed in some manner to retain them in the desired assembled relation. In the embodiment shown in FIGS. 1 to 6, the enclosure is made up of two envelopes such as shown at 26 in FIG. 3. While these envelopes may be tubular, i.e. open at two opposite ends, as shown they are each open at one end and closed at the other. One of these envelopes is applied as a horizontal envelope as indicated at 26a in FIGS. 1, 2 and 4, and the other is applied outside of the first as a vertical envelope 26b. In FIG. 1 the upper portion of the front face of the outer sleeve 26b has been broken away and removed, thereby disclosing the target face 27 which lies between the front faces of the horizontal and vertical envelopes 26a and 26b. Preferably at least the outer envelope 26b is formed of transparent or partial transparent sheet material such as polyethylene, so that the visual markings applied to the target sheet 27, for instance the bull's eye 28 will appear through the outer envelope. The walls of the enclosure envelopes will also serve as membranes contributing to the energy conversion system of the target.

The assembled relation of the various sections in the target will also be apparent from the sectional view of FIG. 4. By assembling and positioning the sections in the manner illustrated and described, the number of points or lines in the total target volume at which an arrow could penetrate without encountering all or substantially all of the membranes or sheets of the resilient and tear resistant resin is reduced to a minimum. Indeed, throughout most of the area of the target, the penetrating arrow will encounter a multiplicity of plies or membranes in the manner indicated by the arrow 29 shown as penetrating the target in FIG. 4.

As clearly shown in FIG. 4 the point of the arrow has penetrated about 5/6 of the distance through the target and in doing so has encountered numerous membranes of the sheet resin material, each such membrane being punctured by the arrow point, and because of the elastomeric or resilient character of the material, the sheet material around each hole spreads and deflects in a manner developing a sleeve having surface contact with the arrow and imposing frictional drag upon the arrow point and particularly upon the arrow shaft. It is this snug frictional fit of the sleeve surrounding each aperture which is effective in arresting the motion of the arrow into the target. Moreover, the fact that most of the layers of the sheet material are separated by resilient porous or foam resin material provides space and opportunity for each layer of the sheet material to properly form the friction sleeve referred to and also the somewhat conically shaped portion which interconnects the sleeve and the surrounding portions of the membrane. While the porous material will impose some drag upon the shaft of the arrow, the principle drag is supplied by the snug fitting sleeve portions surrounding the aperture formed by penetration of the arrow.

Although in FIG. 4 the arrow is illustrated as penetrating only about 5/6 of the target, it should be understood that it is contemplated that arrows of high velocity and mass may well penetrate entirely through the target and even project for some appreciable distance beyond the rear face of the target. The friction sleeves formed by penetration of the membranes will continue to perform the function of absorbing energy even where the arrow penetrates through and beyond the back face of the target. In this respect, the target of the present invention is in striking contrast to prior targets relying upon deflection of panels or the like within the target in order to absorb the energy of the arrow. If such panels are penetrated, the energy absorption value thereof is virtually destroyed. It is also of significance that since in applicant's system, friction sleeves of the membranes continue to absorb energy even if the arrow completely penetrates and extends beyond the back face of the target, it becomes possible to provide for absorption of a given quantity of energy with less total weight of materials, and this is a factor of considerable importance because of the costs of various of the resin materials useable for these purposes.

Figure 7:
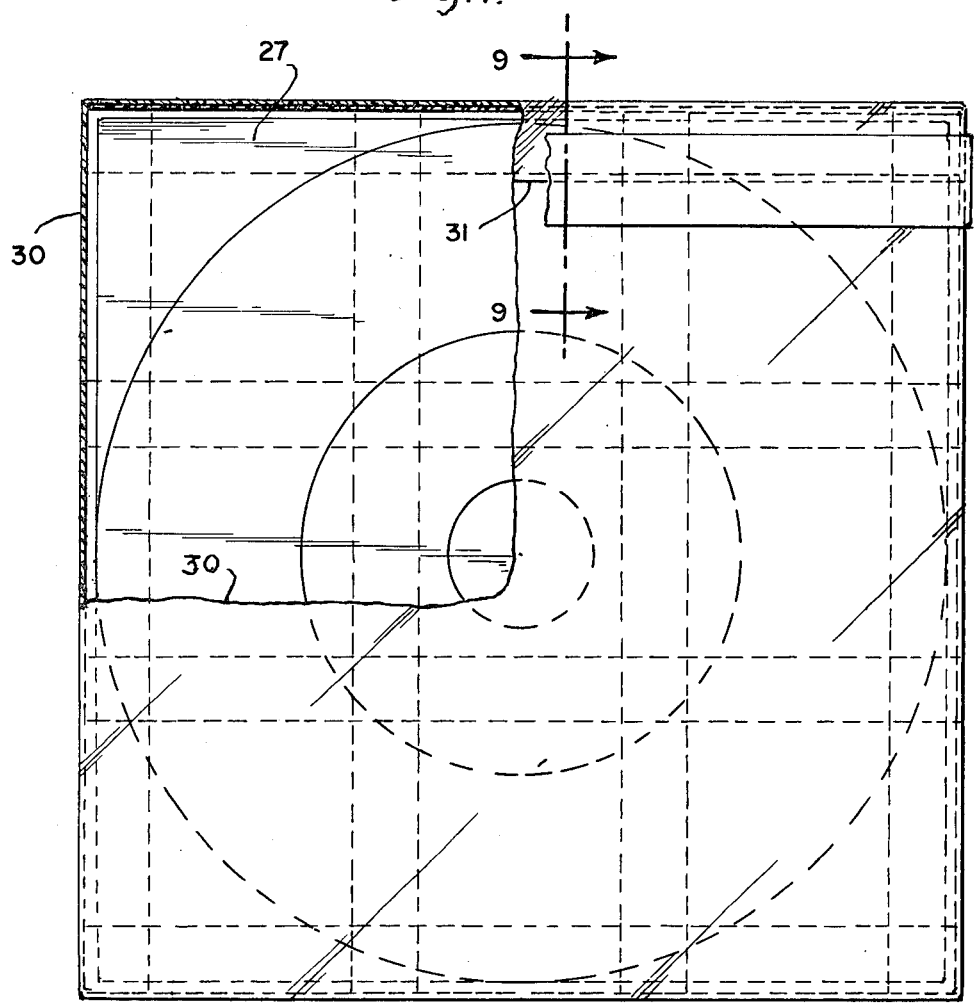
FIG. 7 is a view similar to FIG. 1 but illustrating a modified form of target enclosure.
Figure 8:
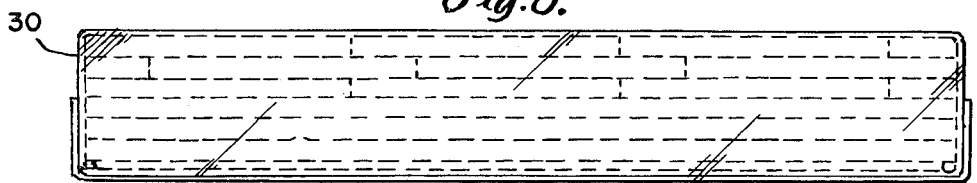
FIG. 8 is a top edge view of the arrangement shown in FIG. 7.
Figure 9:
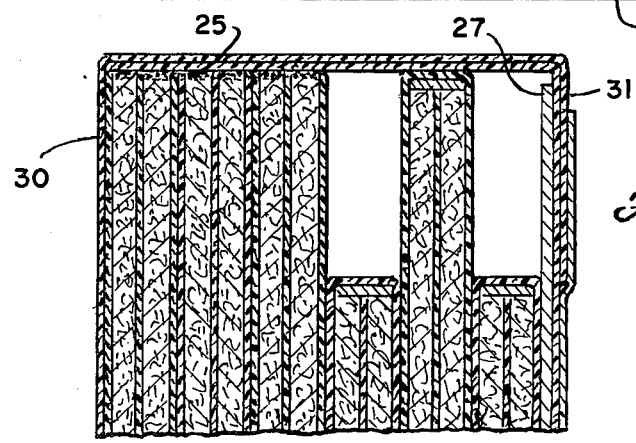
FIG. 9 is a fragmentary sectional view taken as indicated by the section line 9—9 on FIG. 7.
Figure 22:
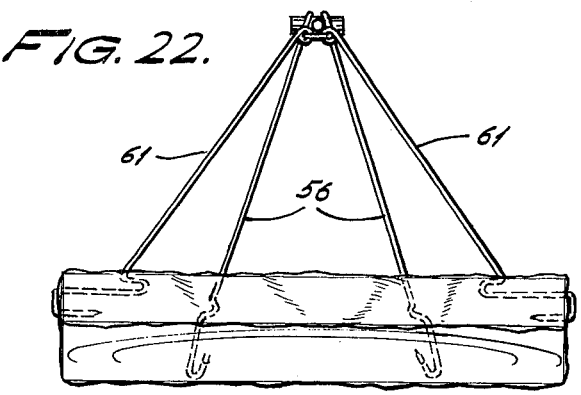
FIG. 22 is a plan view of the target and stand.

In the embodiment of FIGS. 7, 8 and 9, the same type and arrangement of elements and sections is disclosed, but the assembly of the parts is shown as being enclosed in a bag or complete envelope 30, instead of by means of a pair of open ended envelopes applied respectively in horizontal and vertical positions, as in the first embodiment. The envelope of FIGS. 7 to 9 is preferably provided with interengagable lip portions as indicated at 31 which may, if desired, carry a pressure sensitive adhesive in order to seal the envelope around the target, and thus protect the target against weathering.

In FIGS. 12 to 14, there is disclosed a stiffening component adapted to be applied to a target such as shown in FIG. 1 or in FIG. 7. This component may be made of any suitable fiber board, corrugated board or rigid sheet plastic, and preferably consists of a strip 32 of such material completely surrounding the edges of the target and preferably positioned within the enclosing envelope, as appears in FIG. 14. This stiffening element is adapted to be collapsed in the manner shown by FIGS. 12 and 13, so that when completely collapsed (as in FIG. 12) it may readily be inserted in a shipping or packaging carton in which the entire target may be enclosed and shipped when disassembled and packed for shipment. The various sections of the target may simply be stacked one upon the other as indicated by dotted lines in FIG. 15 and the stiffening strip 32 may be assembled with a suitable target face and with the sections, for instance at the bottom of the stack as indicated in FIG. 15. Assembly instructions or the like may be included in the package at 33, and the entire stack of parts enclosed in a carton or by a wrapper, such a carton being indicated at 34 in FIG. 15.

Although in FIGS. 12, 13 and 14 the edge stiffener 32 comprises a unitary strip extended all the way around the edge of the target, it is to be understood that edge stiffening may also be accomplished by means of separate strips at each edge of the target.

It is to be understood that the target is preferably made up of a multiplicity of sections and that these components may be of different width, length and thickness, according to the desired target dimensions. Although the assembly of three tongue and groove sections in each of two layers or planes of the target is here shown, it will be understood that a different number of sections may be assembled in each layer, depending upon the target dimensions and also upon the width dimensions of the sections.

As above noted, the individual elements of which the target sections are made up may have several alternative forms of construction and may be fabricated in various different ways. In FIGS. 16 to 19 inclusive, there is diagrammatically illustrated an equipment and a system of the general kind suitable for making such elements. The illustrations of FIGS. 16 to 19 show the use of such equipment in the making of elements of slightly different configuration than those described above in connection with FIGS. 1 to 9 inclusive. The configuration of this modified element will be apparent from examination of FIGS. 18 and 19 and will also appear more fully from consideration of the following description of the fabrication technique which is here given in relation to all of FIGS. 16 to 19 inclusive.

Referring first to FIGS. 16 and 17, attention is directed to the pair of endless conveyor belts 35 and 36 which are mounted and driven to provide adjacent passes therebetween of a group of strip-like components which are fed from sources of supply shown at the right of FIG. 16. Thus, FIG. 16 shows supply rolls 37,37 for strips of sheet resin material, for instance polyethylene, which are fed along with the intervening layers of porous material delivered from the supply rolls 38. Another layer of sheet resin material is introduced between the porous strips, being supplied from the roll 39. This makes up a sandwich or laminate which is shown in FIG. 18.

In addition, edge stiffening strips of the kind described above are fed from the supply rolls 40,40, being delivered to the edges of the sandwich just described, and the entire assembly of these parts is advanced through the equipment by the action of the conveyor belts 35 and 36 which preferably carry a multiplicity of projections or points such as indicated at 41 in order to assure the desired feed of the various strips through the system.

As the assembly of strips is advanced in the feed path between the endless belts 35 and 36, the edge portions are received by the upper and lower pairs of guides 42 and 43 and throughout a portion of the feed path heat sealing elements 44 engage the edge strips 40 and transmit heat therethrough to the edge portions of the plastic sheet and porous strips 37, 38 and 39 thereby effecting a fusion or heat sealing thereof along the edges of the sandwich. The upstream portions of the elements 44 may be heated in any suitable manner as by electrical heating units indicated at 45. The strips 40 may be formed of a variety of materials, for instance of vulcanized fibers as above mentioned and the heat sealing operation will result in adherence of the stiffening strips in their edge positions thereby producing a sandwich element similar to that described above with respect to FIGS. 5 and 6, except that the elements produced in accordance with FIGS. 16 to 19 do not have layers of the sheet resin material lying outside of the edge stiffening strips 40. The guide elements 42 and 43 desirably have cooling means associated therewith, for instance cooling medium circulating tubes 46, to prevent excessive heating of the upper and lower faces of the edge portions of the sandwich in at least that region where the heaters 45 are operating to heat seal the edges of the sandwich. These cooling tubes are preferably also extended downstream beyond the downstream ends of the heaters 45.

In order to assure solification of the edge portions of the heat sealed sandwich before delivery from the forming equipment, the bars 44 are desirably cooled toward their downstream ends by means of additional cooling medium circulating tubes 47 (see particularly FIG. 19).

The upper edge guides 42 are preferably fastened to pivoted supports 48 so that these guides may be lifted upwardly in order to expose the feed path and thus facilitate threading of the equipment and allow for some variation in width of the stiffening edge strips.

As with the elements and sections above described, the same materials may be employed in the fabrication of the elements referred to in the description above relating to FIGS. 16 to 19.

The individual elements may take still other forms, for instance as illustrated in FIG. 10 in which side face sheet strips or membranes 49,49 are employed with a porous and resilient core 50, without a central dividing strip or membrane such as shown at 23 in FIG. 6 and at 39 in FIGS. 16 to 19. As in FIGS. 16 to 19, the edge stiffening strips 51 are heat sealed to the sheets 49 and core 50, which may be done in the same general manner as described above with reference to FIGS. 16 and 19.

Still another form of element is illustrated in FIG. 11. Here membranes or face sheets 52,52 are again assembled with a porous core 53, but in this case no separate stiffening edge strip is included. Instead, heat sealing of the edge portions is accentuated sufficiently to provide a fused resin strip at the edges, as indicated at 54,54. In this way, the desirable stiffening is accomplished without even inserting a separate strip. An operation of this kind may also be carried out in the general manner indicated in FIGS. 16 and 19 and described above in connection with those figures.

An element of the construction illustrated in FIGS. 5 and 6 and described above may also be made by the continuous feed of strip materials from supply sources. The element shown in FIGS. 5 and 6 is made up of a pair of porous strips 22 with a membrane 23 therebetween and with reinforcing strips 24 at opposite edges, all of these internal components being enclosed in a tube of sheet material indicated at 20, having edge portions 21 extended over the reinforcing strips 24 so as to enclose all of the internal components within the tube.

Although such an element may be made by assembling and inserting the internal components into a preformed sheet resin tube, in an alternative fabrication technique, all of the internal components may be feed into a hollow mandrel and the enclosing tube may be formed from a flat web of sheet resin material fed to and folded or wrapped around the mandrel and after sealing of the free edges fed beyond the mandrel along with the internal components, thereby providing for formation of the enclosing tube concurrently with the feed of the internal components. The resultant composite board element may then be cut to appropriate lengths for making up the sections of the target for instance the tongue and groove type sections fully described above.

Although reference has been made above to the use of certain materials in making targets according to the present invention, it will be understood that certain variations are usable, as is indicated hereinafter.

The sheets or films employed to form the membranes are desirably made of polyethylene as indicated, but any of a number of materials may be used. The materials used should be penetrable, elastomeric or resilient, and tear resistant, such as polyethylene or other plastic films, for instance nylon, vinylidene chloride, or plasticized polyvinyl chloride. Certain well bonded fine and long fiber mats may be used. In all cases the materials should also be self-healing or recoverable. For archery purposes, when using sheet or film resin material for the membranes, the strips of sheet material are advantageously of a thickness of the order of 0.004 inch (0.1 mm) and with films or sheets of such thickness, it is preferred to employ about 20 plies in the make up of the target. Preferably the total thickness of the piles should be at least 0.08 inch (2 mm), and this may be provided by employment of at least 10 plies where the individual films are 0.008 inch (0.2 mm) or by a minimum of 20 plies where the films are 0.004 inch (0.1 mm) or a minimum of 40 plies where the individual films are 0.001 inch (0.05 mm). Other thicknesses may be used for purposes other than archery.

With respect to the porous or foam spacer material, foamed low density polyethylene or polyolefin, such as polypropylene, of about ¼ inch (6 mm) thickness and 1.0 lbs. per cubic foot (0.016 gr. per cubic cm) density may be used. However, any porous, soft, tear resistant and resilient material may be employed, including polyethylene foam, flexible urethane foam, or low density mats such as curled hair, cellulose and fiber glass. The material selected should preferably also be self-healing (recoverable). In this specification and in the claims, in referring to the spacer material as being "porous", it is to be understood that this term is not being used in the limited sense requiring the presence of intercommunicating or open pore cells. The material may be either open cell or closed cell porous material and, as already indicated, may even comprise matted or curled fibers or hair, which is also characterized by the presence of interstices or pores. The important factor here is the presence of interstices or pores which can accommodate the development of the friction sleeves surrounding the apertures formed by penetration of the arrow through the membranes, and any "porous" material having appropriate resilience or elastomeric properties will serve this purpose.

Edge stiffeners such as those described above can be formed not only of vulcanized fiber, but also of certain other materials which are impact resistant and preferably which are not likely to be split or shattered if struck by an arrow point. Cellulose board and also various plastic sheet materials may be used, such as high or low density polyethylene, polypropylene and rigid polyvinyl chloride strips. Stiffening strips may be of various thicknesses, for instance about 0.05 inch (1.25 mm) and will be of width according to the thickness of the element being formed, for instance about (1.25 cm).

In connection with the enclosure for the target, the invention contemplates several alternatives. Thus, where the target is enclosed by a pair of sleeves and where the target face comprises a separate sheet enclosed by at least the outer sleeve, it is contemplated that sheet material, of which the outer sleeve is formed, for instance polethylene, shall be transparent. If the target face lies between the two sleeves, then the inner sleeve, may be opaque, as by addition of a pigment to the resin material employed.

An enclosure sleeve formed of an opaque resin composition has the advantage of being more resistant to deterioration by exposure to the sun. Alternatively, if the target face is to be viewed through one or both of the enclosure sleeves, resistance to deterioration from sun light may be imparted to the resin composition by incorporation of an ultraviolet light inhibitor in the resin composition.

Still other alternatives in connection with the enclosure or envelope is the use of opaque sheet material, such as polyethylene, and the printing or application of the target face on the outside of the envelope of one or both sides of the target.

Polyethylene sheet resin is a preferred material for the enclosure but certain other resin materials may be employed, including appropriately formulated polyvinyl chloride or polyvinyl fluoride.

Targets made according to the invention are of exceedingly light weight as compared with conventional straw targets. For example a target made according to the invention measuring 3 × 3 feet and of adequate thickness (about 5 to 6 inches) to stop arrows cast by a 60 pound (27 kg) bow, weighs only about 6 pounds (2.75 kg) which is contrasted with a comparable straw mat target weighing about 40 pounds (18.16 kg).

The target of the invention has long life because it is formed of essentially self-healing materials, and also because the positions of the sections are interchangeable in the target, so that different elements and sections may be brought into the zone in which most of the arrows strike.

The target of the invention is highly weather resistant and is also mildew, vermin and insect resistant.

In considering the target stand provided according to the invention, it is first noted that since the target or target butt itself is of relatively light weight, a stand of heavy and cumbersome construction is not needed. Because of the light weight of the target butt itself, the stand may be formed in a very simple manner as will further appear.

Figure 20:
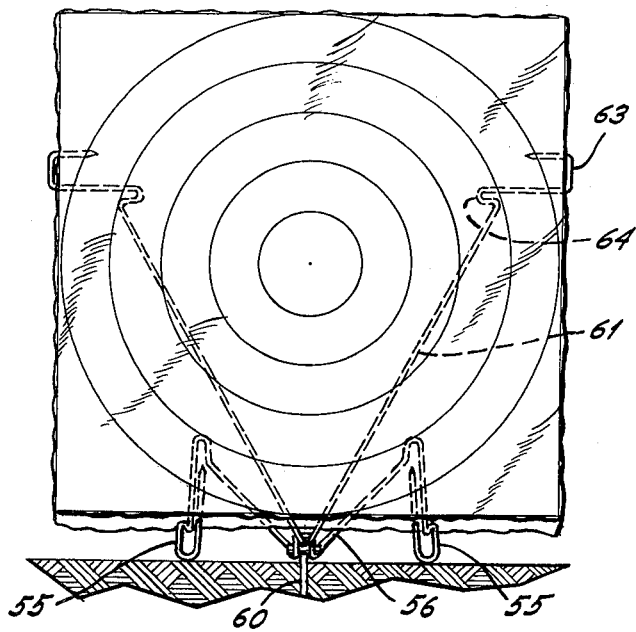
FIG. 20 is a front elevational view of a target according to the present invention mounted on a stand according to the invention.
Figure 21:
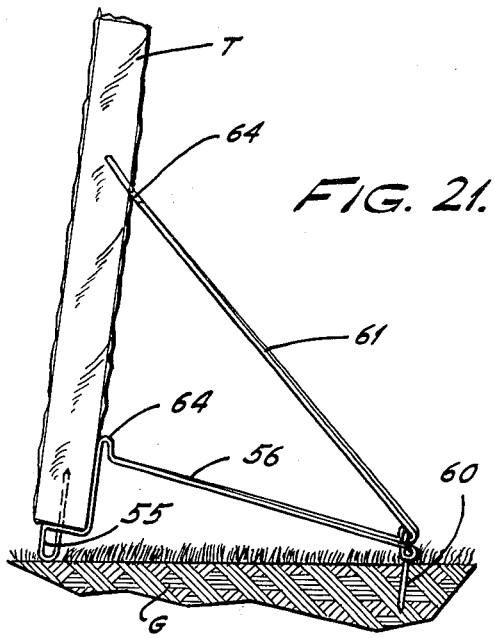
FIG. 21 is a side elevational view of the target and the stand.
Figure 23:
FIGS. 23 and 24 are views respectively illustrating two different stand elements employed in the target stand.
Figure 24:
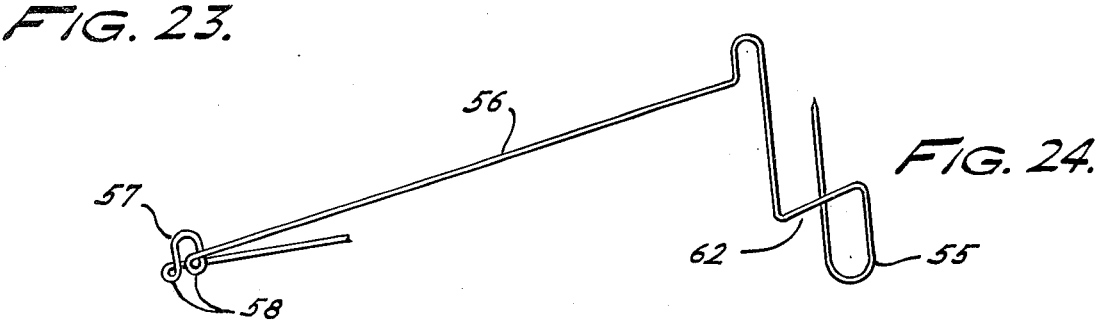

As is illustrated in FIGS. 20 to 27 inclusive, the target stand provided according to the present invention is composed principally of bent wire elements of the kinds shown individually in FIGS. 23 and 24. The wire employed may be about ⅛ inch in diameter. In FIGS. 20, 21, 22 and 26, the target itself is indicated by the letter T, and this target is of the construction hereinabove fully described, being made up of membranes and intervening porous spacing layers. A three-point or tripod type of support is provided, including a pair of bent wire supporting feet 55,55, adapted to rest upon the ground indicated at G. These supporting feet are formed at the forward ends of the bracing elements 56 which extend rearwardly from the feet of the target toward each other and which are actually joined and are formed from a common piece of wire, the joint between the two bracing elements 56 being indicated at 57. The wire of the bracing elements 56 is bent into loops 58 interconnecting the bracing elements themselves and the joint 57 which interconnects them. The loops are provided to pivotally receive a transverse rod or tube 59 having a central transverse aperture receiving the spike 60 which serves as the anchoring element for the target stand by being pivoted downwardly to the position indicated at 60a in FIG. 25, and driven into the ground G as illustrated in FIGS. 20 and 21. This pivotal arrangement of the spike 60 not only provides for downward projection of the spike to be driven into the ground for outdoor use, but is of importance because in the position where the spike extends horizontally, as shown in full lines at 35, the spike is "retracted" so to speak, which is of advantage when the target is used under certain conditions, particularly indoors, in which event, it may be desirable to utilize sand bags or the like as a weight resting upon the spike to fix the position of the target on any desired surface. The retracted position of the spike is also of importance for packing and shipment The joint part 57 serves also as a point of attachment of the upper bracing elements 61,61, the end portions of each of which are bent to provide an eye 62 through which the joint part 57 extends (see FIG. 23), thereby serving to interconnect all four of the bracing elements 56,56 and 61,61.

The spike 60 cooperates with the feet 55,55 in providing the three-point support system of the target stand.

Figure 26:
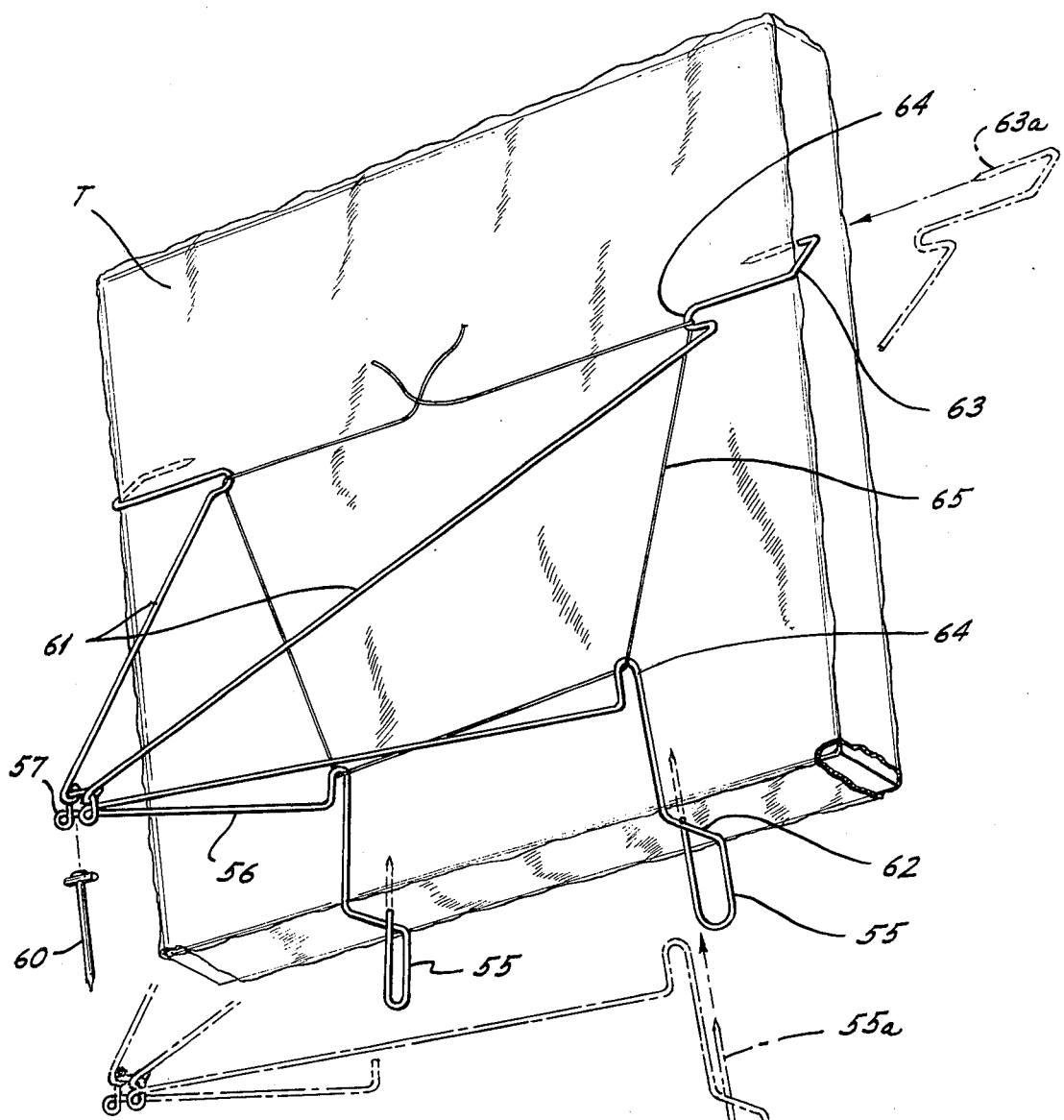
FIG. 26 is a perspective rear elevational view of a target with stand elements being applied and indicating the manner of application.

Each of the foot parts 55 terminates in a free end adapted to be forced upwardly into the materials of the target, in the manner clearly indicated at 55a in FIG. 26. The bent part 62 of each of the foot elements is arranged to provide a support under the lower edge of the target.

Similarly, each of the upper bracing elements 61,61 is provided with a terminal portion 63, adapted to engage an edge of the target and having a free end portion adapted to be forced into the material of the target in the manner clearly indicated at 63a in FIG. 26.

In connection with the free ends of the portions 55 and 63 of the target, braces which are forced into the material of the target, it is contemplated that appropriate markings be provided at the edges of the target, for instance on the edge stiffening strips, indicating the points of entry, and thereby facilitating assembly of the stand to the target.

The lower and upper bracing elements 56 and 61 also each have a bent loop such as indicated at 64 positioned so that the entire assembly of bracing elements and the target may be fastened together by means of a simple cord 65 wound around the several bracing elements in the manner clearly shown in FIG. 26.

The arrangement and construction of the stand is particularly adapted to the target of the present invention for several reasons including the fact that the stand does not include any backing board or the like behind the target which would interfere with penetration of arrows through the target and projection thereof beyond the rear face of the target. As above pointed out, it is important in the target of the invention (employing the penetrable membranes) that penetration must not be inhibited.

The employment of the target stand as described above with the sectionalized target as described above is of special advantage from the standpoint of packaging and shipment. Thus, with a typical target made up of three sections in each of two layers or planes of the target, the target sections may be packaged in the manner shown for example in FIG. 15, the sections being stacked one upon the other.

Figure 27:
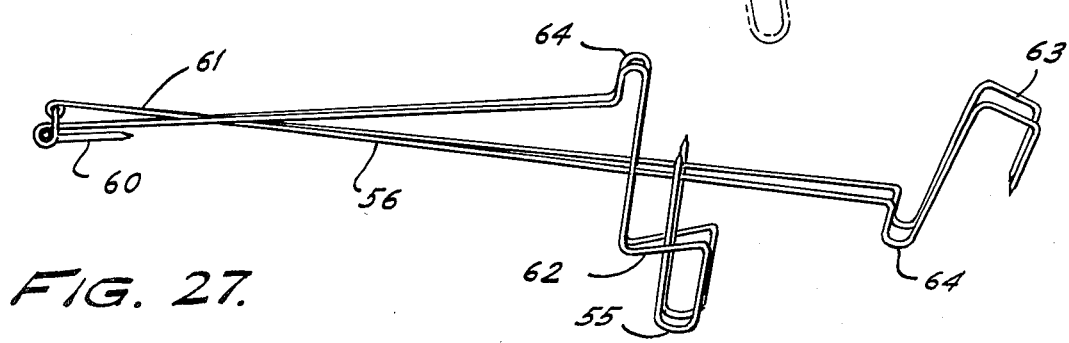
FIG. 27 is a view of the target stand in collapsed condition.

The target stand as above described is readily assembled with and removed from the target itself, and the stand may also be collapsed to a substantially flat form or packet as illustrated in FIG. 27. When the target stand is collapsed, various elements of the stand lie substantially in a common plane and do not project beyond an area roughly equivalent to one of the target sections. The stand may therefore be readily accommodated in the same carton as the target sections.

Figure 25:
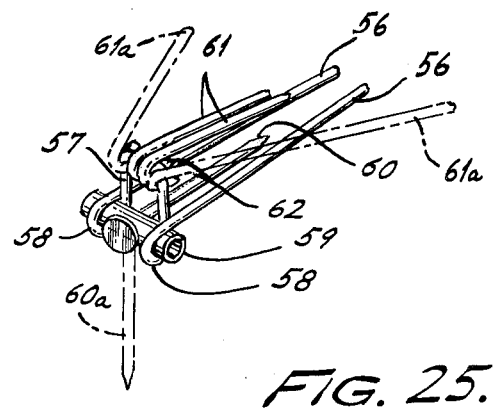
FIG. 25 is an enlarged fragmentary view illustrating the connection between the several elements incorporated in the stand.

In connection with the erection and collapse of the target stand, attention is called to the fact that in FIG. 25 a portion of the braces 61 including the root end mounting eyes 62 are shown in full lines in the position occupied when the stand is collapsed as in FIG. 27. In FIG. 25, the dot-dash position of these same elements indicated at 61a shows the position of the mounting eyes when the stand is erected and fastened to a target butt. From these two positions of the braces 61 and 61a, it will be seen that the root end mounting eyes are angularly tilted with respect to each other as between the two positions, and this angular tilt is accommodated by the shape and arrangement of the joint loop 57.

The entire target and stand of the invention is easy to handle, store, set up and transport. For shipping purposes, the components of a 3 ft. (91.5 cm) target and stand may readily be disassembled and stacked and inserted for shipment in a carton adapted to receive a stack of parts measuring 12 ×14 ×36 (30.5×35.5 ×91.5 cm).

Another advantage of the present invention lies in the fact that the target face is disposed within the transparent enclosure for the target. This greatly reduces the tendency to tear the target face, which occurs with conventional targets where the target face is located exteriorly of the target. Such exterior location result in an objectionable tendency for the target to be torn as a result of arrows striking the target in angles or positions other than perpendicular to the plane of the target face.

I claim:

1. An archery target comprising an assembly of a multiplicity of superimposed parallel membranes of sheet resin material, and a multiplicity of parallel layers of resilient and porous material interposed between and each serving to interspace at least a plurality of the membranes, the membranes and layers being secured together in assembled relation with a multiplicity of the membranes and a multiplicity of the interposed layers of porous material overlying each other in parallel relation in all areas of the assembly and the assembly having a front or target face and a back face, the membranes being penetrable by an arrow cast at the target face and being resilient and tear resistant, and the layers of resilient and porous material being penetrable by an arrow cast at the target and providing freedom for formation of sleeve shaped portions of the membranes engaging the arrow around the penetration apertures to provide for imposition of frictional drag in a plurality of zones along the shaft of an arrow penetrating the target and also for partial recovery after withdrawal of the arrow, the front or target face of said assembly being exposed for penetration by arrows cast at the target and the back face of the assembly being substantially unobstructed thereby providing for partial penetration of arrows through and beyond even the rearmost membrane of the assembly.

2. An archery target as defined in claim 1 and further including an enclosure for the assembly of membranes and layers of resilient and porous material, said enclosure being formed of resilient tear resistant sheet resin material.

3. An archery target as defined in claim 2 in which the sheet resin material of said enclosure is at least partially transparent at one side of the target, and a target face sheet within the enclosure and positioned under and visible through the transparent portion of the enclosure.

4. An archery target as defined in claim 1 in which the sheet resin material comprises polyethylene.

5. An archery target as defined in claim 4 in which the resilient and porous material comprises polyolefin foam.

6. An archery target as defined in claim 1 and in which the target further includes stiffening strips lying in planes transverse to the plane of the target in one or more spaced zones intermediate the marginal edges of the target to provide localized stiffening of the assembly of membranes and layers of porous material.

7. An archery target as defined in claim 6 in which stiffening means are provided at the marginal edges of the target as well as in zones intermediate the marginal edges.

8. A target as defined in claim 1 and further including stiffening means for the target comprising a stiffening means extended around the perimeter of the target with portions lying in planes at right angles to the mean plane of the target.

9. A target as defined in claim 1 in which the membranes and layers of porous material are grouped in sections interchangeably assemblable in different areas between the front and back faces of the target.

10. A target as defined in claim 1 in which a target face sheet is carried by the assembly at the front or target face thereof.

11. A target of rectangular shape comprising an assembly of a multiplicity of board shaped elements of greater width than the thickness thereof, the board shaped elements lying in parallel planes and being superimposed upon each other in said planes, each element being of length sufficient to span the distance between two opposite side edges of the target and each element being of width less than the distance between the other two opposite side edges of the target, and the assembly including board shaped elements in edge-to-edge relation between said other two opposite side edges of the target, and each of the board shaped elements comprising a resilient and porous core with covering layers at each side, the covering layers being formed of resilient, penetrable and tear resistant sheet resin membranes.

12. A target as defined in claim 11 in which a membrane of resilient and tear resistant sheet resin material is positioned in the porous core of each board shaped element.

13. A target as defined in claim 11 in which at least some of the board shaped elements further comprise stiffening means at edges thereof lying in planes transverse to the plane of the target, and the target further including such stiffening elements positioned so that the stiffening means thereof lie in planes transverse to each other.

14. A target as defined in claim 11 in which at least some of the board shaped elements further comprise stiffening strips extended along the edges thereof and lying in planes transverse to the plane of the element.

15. A target as defined in claim 14 in which the stiffening strips comprise separate strip pieces assembled with the core and covering layers of the elements.

16. A target as defined in claim 14 in which the core of each element comprises foamed resin material and in which the stiffening strips comprise fused edge portions of the core of the elements.

17. A target as defined in claim 16 in which the sheet resin material of the covering layers is fused with the edge portions of the core.

18. A target as defined in claim 11 in which board shaped elements are assembled and secured together in groups of three superimposed elements with adjacent edges offset from each other in the plane of the target to provide tongue and groove sections, and the target including a plurality of such sections assembled with the tongue of one section received in the groove of another section.

19. A target as defined in claim 18 in which the target includes tongue and groove sections assembled in a plurality of planes parelleling the plane of the target, with the tongue and groove joints between the sections in different planes extended in directions transverse to each other.

20. A target as defined in claim 11 and futher including a sheet resin material enclosure for the assembled elements of the target.

21. A target as defined in claim 20 in which the enclosure comprises two tubular enclosure sleeves applied to the target in perpendicularly offset planes.

22. A target as defined in claim 20 in which a side face of the enclosure is opaque and has a target face carried thereby.

23. An archery target comprising a multiplicity of board shaped elements, each being of tongue and groove configuration and each comprising a plurality of strips of resilient and porous material with a plurality of covering layers of resilient and tear resistant sheet resin material, the board shaped elements being assembled in edge-to-edge relation with the tongues and grooves of adjacent elements interengaged with each other, the covering layers comprising membranes penetrable by an arrow.

24. A board shaped element of tongue and groove configuration constructed as defined in claim 23.

25. A board shaped element formed of a plurality of strips of resilient and porous material each having a covering layer of resilient and tear resistant resin material, the covered strips being assembled and interconnected in face-to-face relation with adjacent strips offset from each other in a pattern providing a board shaped element of tongue and groove configuration.

26. An archery target comprising a multiplicity of board shaped elements, each board shaped element comprising one or more membranes of sheet resin material and one or more layers of resilient and porous material in face-to-face relation, the target including such board shaped elements positioned in superimposed relation in at least three parallel planes each of which contains a plurality of board shaped elements, the board shaped elements in the several planes being offset from each other so that an arrow penetrating any three adjacent parallel planes must penetrate at least one board shaped element.

* * * * *

UNITED STATES PATENT AND TRADEMARK OFFICE
CERTIFICATE OF CORRECTION

PATENT NO. : 4,076,246
DATED : February 28, 1978
INVENTOR(S) : Leonard S. Meyer

It is certified that error appears in the above-identified patent and that said Letters Patent are hereby corrected as shown below:

Col. 8, line 38, change "16 and 19" to read --16 to 19--;

line 48, change "16 and 19" to read --16 to 19--.

Col. 9, line 24, change "piles" to read --plies--.

Col. 12, line 28, change "12x14x36" to read --12"x14"x36"--.

Signed and Sealed this

Sixth Day of June 1978

[SEAL]

Attest:

RUTH C. MASON
Attesting Officer

DONALD W. BANNER
Commissioner of Patents and Trademarks